Feb. 16, 1954

W. W. CARPENTER 2,669,304

RECORD CONTROLLED REPRODUCING SYSTEM

Filed May 1, 1946

INVENTOR
W. W. CARPENTER
BY
R. Marino
ATTORNEY

Feb. 16, 1954    W. W. CARPENTER    2,669,304
RECORD CONTROLLED REPRODUCING SYSTEM
Filed May 1, 1946

INVENTOR
W. W. CARPENTER
BY
R. Marino
ATTORNEY

Feb. 16, 1954   W. W. CARPENTER   2,669,304
RECORD CONTROLLED REPRODUCING SYSTEM
Filed May 1, 1946   5 Sheets-Sheet 5
FIG.5A
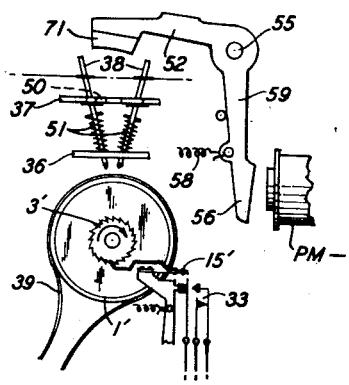
FIG.5B
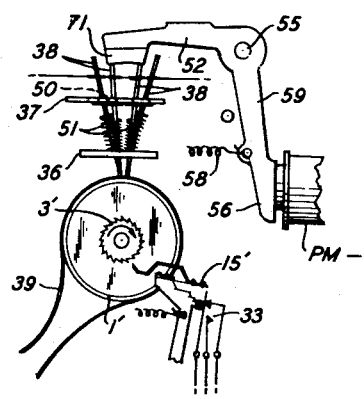
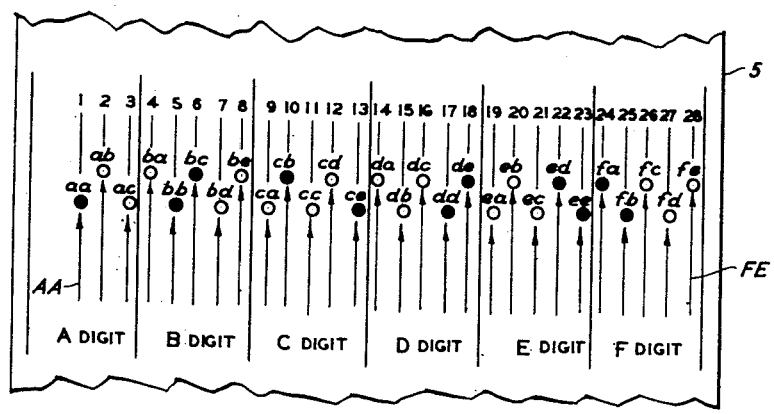
FIG.5C
INVENTOR
W. W. CARPENTER
BY
ATTORNEY Patented Feb. 16, 1954

2,669,304

UNITED STATES PATENT OFFICE 2,669,304

RECORD CONTROLLED REPRODUCING SYSTEM

Warren W. Carpenter, Garden City, N. Y., assignor to Bell Telephone Laboratories, Incorporated, New York, N. Y., a corporation of New York Application May 1, 1946, Serial No. 666,280

11 Claims. (Cl. 164—115)

This invention relates to record-controlled reproducing systems and more particularly to a system in which recorded intelligence characters are reproduced under the control of a selected one of said intelligence characters. This broad object of the invention is attained by an apparatus structure which involves the combination of a novel record-sensing device and a plurality of reproducing devices, each of the latter being selectively chosen in response to an intelligence character, as the agency for reproducing a group of recorded intelligence characters of which the "selecting" intelligence character forms a part.

A particular object of the invention is a novel arrangement of the sensing device and certain control apparatus whereby a group of intelligence characters is reproduced on a tape associated with a selected one of the reproducing devices, the selection of said reproducing device being determined by a specific one of a number of selectable characters in the group of intelligence characters.

Another object of the invention is the control of the reproducing elements of all reproducing devices by means which are common to all reproducing devices, said means being selectively responsive to the sensing of the characters in a group of intelligence characters, whereby the corresponding reproducing elements selected in all reproducing devices are brought under the respective and operative control of a mechanism individual to each reproducing device. The particular mechanism which is selected in response to the sensing of one of the characters in the group of intelligence characters being sensed is then operated to cause the reproducing elements of the reproducing device to which said mechanism belongs to operate and record said sensed group of characters on a tape or other impressible medium associated with said device.

Yet another object of the invention is a novel arrangement of a common drive for the record-advancing mechanism of the sensing device and the means that sense the record to be analyzed, in combination with a mechanically-driven ratchet mechanism in the drive which causes the sensing means to sense the characters in one sensing position and the ratchet mechanism to advance the record between sensing positions, said ratchet mechanism being so arranged that an added actuatable control can cause the record to remain in one sensing position for any desired period while the drive causes the sensing means continuously to sense the characters in said one sensing position during this period. By means of this arrangement the movement of the sensed record may be arrested for any desired period without interrupting the action of the sensing means which thereby will repeatedly sense the same line of characters.

The invention, of which one embodiment is herein described in detail by way of illustration, is exemplified by a record-controlled reproducing system in which the record to be sensed comprises a perforated record, the sensing device comprises sensing pins arranged to reciprocate against unperforated portions of said record, or to engage the record perforations, and the reproducing devices comprise a plurality of reperforators with punching pins controlled by a common group of magnets selectively responsive to the sensed record perforations. It should be understood however that the embodiment of the invention herein set forth in detail by way of illustration is not a limitation thereof but merely an exemplification of the many forms said invention may take, the reperforators being typical of any device adapted for recording on any suitable recording strip or medium by punching, dotting and embossing; and the sensing device or tape "reader" being typical of any device adapted for sensing by mechanical fingers or the like any suitable record strip or medium having code holes, embossing or dotting therein; by electromechanical sensing fingers or the like for sensing conductive areas; by radiant energy devices for sensing translucent or reflecting areas, etc. For the purpose of claims appended hereinunder which are not limited to specific sensing or recording means, all these equivalent sensing and recording means are comprised within the scope of the invention.

The above and other objects of the invention will be more clearly understood from the following detailed description, appended claims and attached drawings in which:

Fig. 1A shows an exploded view of the relation between two members of the reperforator selector RS represented in Fig. 1;

Fig. 5A is a side elevation of a reperforator in an unoperated position, showing the normal disposition of the punch-pins of the reperforator with respect to the punch hammer thereof;

Fig. 5B is a side elevation of the reperforator in an operated position, showing the operated position of the punch-pins with respect to the operated punch hammer; and Fig. 5C shows a portion of the record tape, conventionally indicating a full set of punching positions for recording six digits thereon, together with an indicated sensing pin for each punching position.

Figure 1:
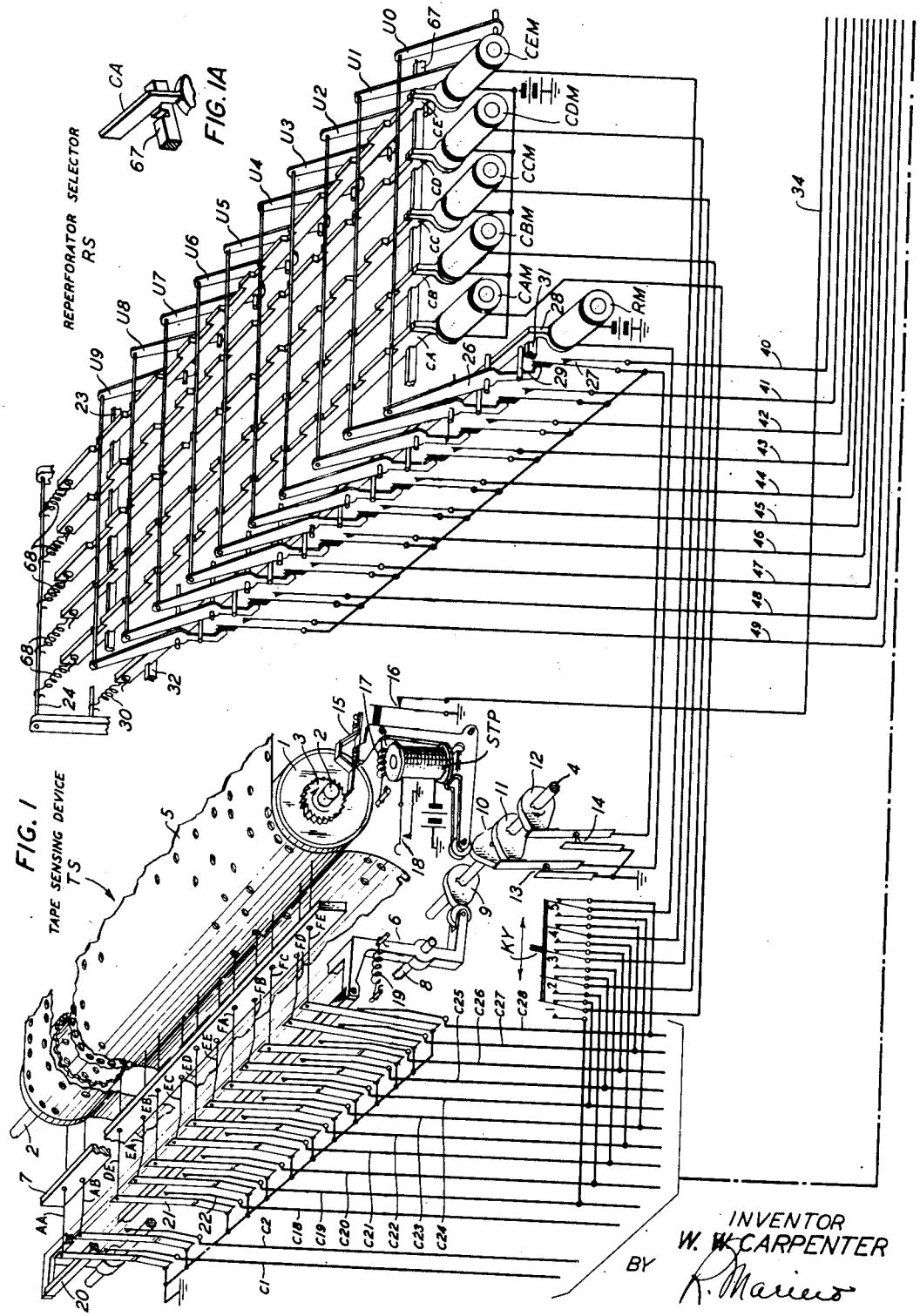
Fig. 1 is an isometric schematic showing of the tape sensing device and a reperforator selector.

Referring, now, to the figures of the drawing, Figs. 1 to 4 of which should be placed end to end in the ascending order from left to right to completely disclose the invention, the tape sensing device TS comprises a perforated cylindrical tape-feed roller 1 mounted on a shaft 2 rotatively affixed at both ends to the frame of the device (not shown), the magnet STP, a cam shaft 4 driven by a source of controllable power (not shown), a rocker frame 6 pivotally supported on the fixed shaft 8, the twenty-eight sensing pins AA—FE of which one is provided for each transverse sensing position of the tape 5 (registering with corresponding apertures in the roller 1), and the guide-plate 7 securely disposed opposite the one transverse row of positions which are to be probed by the sensing pins. Guide holes are provided in the plate 7 for all the sensing pins, said holes being staggered to conform with the staggered disposition of each transverse punchable position on the record tape 5, and when the pins are moved back and forth in the manner hereinafter described, they pass freely through their respective guide holes to engage the record tape 5 or to pass into depressions in said tape.

The tape feed-roller 1 is of the type disclosed in my copending application Serial No. 588,401 filed April 14, 1945. Briefly, said feed roller is a metallic cylinder the surface of which contains a plurality of conically shaped holes which are spaced across and around the cylinder in coincidence with the perforations on the tape 5 to be sensed. This tape, which is prepared to contain a record in accordance with the teaching of my copending application above-mentioned, is not perforated with circular holes as this term is ordinarily understood, but with cup-shaped depressions which, when the tape 5 is fitted over the surface of the tape feed-roll 1, will fall into the coincident holes of the cylinder and thus provide traction for the tape 5 when the latter is advanced by the rotation of the roller 1 as more particularly described hereinafter.

It will be observed that the cam shaft 4 has four eccentric cams mounted thereon, namely cams 9, 10, 11 and 12. The points of highest eccentricity on cams 9 and 10 are at right angles to each other, while the points of highest eccentricity on cams 11 and 12 which control, respectively, the spring contacts 13 and 14, are aligned and at right angles to the point of highest eccentricity on cam 10, said latter cam being for the purpose of lifting the armature of the magnet STP into an operated position without the necessity of energizing the coil thereof for the purpose. On the other hand, the cam 9 which engages a roller at the end of the rearwardly extending portion of the rocker arm 6 serves to reciprocate the sensing pins AA—FE against the tape 5 when the shaft 4 is rotated, and cause such pins as encounter depressions in the tape to enter the same.

The armature of the magnet STP is a pivoted L-shaped structure to the end of one of whose legs a roller is secured which rides the surface of the cam 10, and to the top of the other of whose legs the pawl 15 is secured which, in the normal position of the armature (when riding the flat portion of the cam 10), engages a tooth in the ratchet wheel 3. The contacts 16 controlled by the armature are opened when the armature is normal and closed when the armature is operated (as shown), that is, when the roller of the armature rides the crest of cam 10.

Now when the source of controllable power is applied to the shaft 4, the latter rotates in the clockwise direction and the cams 9, 10, 11 and 12 mounted thereon rotate with it. In particular, cam 10 rocks the armature of magnet STP about its pivot. When the armature is rocked to the right due to the roller thereof riding up to the crest of the cam 10, the pawl 15 advances into engagement with the next tooth of ratchet wheel 3; when on the further rotation of the cam the armature is rocked to the left by the retractile spring 17, secured to the armature and to the frame of the device, the ratchet wheel 3 is caused to be advanced clockwise by the distance of one tooth, thereby rotating the roller 1 and causing the record 5 to be advanced to a succeeding sensing position. The paper tape 5 is light and there is ordinarily no tendency for the roller 1 to turn when the pawl 15 is retracted. However, the usual retaining pawl engaging the teeth of ratchet 3 or a spring, bearing against roller 1 to provide a slight friction, may be used, if desired, to prevent accidental movement of the record 5 when pawl 15 is retracted.

Thus the record 5 is caused to be advanced to succeeding sensing positions solely by the mechanical action of cam 10 which imparts to the armature of the magnet STP the same operating and releasing movement to advance the feed-roll 1 as would be imparted to said armature by the excitation and non-excitation, respectively, of the magnet's field coil. However, should it be desired to hold the record 5 temporarily in any particular sensing position, key 13 is operated to complete the circuit of magnet STP; which circuit, in energizing the magnet, causes the armature thereof to be attracted against the core, thereby causing the roller secured to the end of the armature to be lifted out of engagement with cam 10, and causing the pawl 15 to engage the next tooth in the ratchet wheel 3. As long as the magnet STP remains energized, cam 10, being clear of the armature roller, will not rock the armature, which thereby remains in the right position against the tension of spring 17. The feed-roll 1 is thus not turned and the record 5 remains in the sensing position to which it was advanced before said magnet was energized. While magnet STP is thus energized, contacts 16 are thereby closed, grounding conductor 34. When, as described later, contacts 14 and 27 then close, magnet RSM0 is energized over a circuit extending from battery through the winding of said magnet, normal contacts 33, conductor 40, contacts 27, and contacts 14 to ground, attracting its armature, which closes the front contacts and opens the normal contacts of contacts 33. Magnet RSM0 is then locked up over a circuit extending from battery through the winding of said magnet and front contacts of contacts 33 to said ground on conductor 34. The tape 39 of reperforator RP0 is, therefore, not advanced. The sensing of succeeding lines of the record 5 and the perforation of succeeding lines by the reperforator is, therefore, suspended.

But although the record 5 is held stationary during the time that the magnet STP is energized, the sensing pins AA—FE are continuously reciprocated by the rocker frame 6 to enter and leave those depressions in the record 5 which are aligned opposite the sensing pins. The action of the sensing pins of the tape-sensing device with respect to record 5 and the resultant effect upon the mechanism of the reperforators may then be observed. When key 18 is released, the circuit of magnet STP is opened and the armature of said magnet released to the control by cam 10. When said cam permits movement of said armature under the influence of spring 17, contacts 16 open, opening the circuit of and releasing magnet RSM0. The normal operation of the sensing device TS and the reperforator RP0, described later, is then immediately resumed.

As before stated, the rocker frame 6 is pivoted on the shaft 8. At the end of the lower extension of said frame a roller is mounted which continuously engages the surface of the cam 9. A retractile spring 19 hooked to the rocker frame 6 and to the frame of the device stores energy during the clockwise oscillations of the rocker frame, which take place during the rotation of the cam 9 through one-half of a revolution, so as to impart counterclockwise oscillations to the frame during the rotation of the cam through the remaining half of its revolution. The upper part of the rocker frame 6 supports a resting bar 20 against which normally rest, under tension, the resilient pin-carrying springs 21, to the upper end of each one of which is secured a sensing pin at right angle thereto, the pin passing through its associated guide hole in the guide plate 7 as before described. Each of the springs 21 is adapted for engagement with a stationary spring 22 individual thereto, thus forming a pair of electrical contacts for each of the sensing pins. Now, when the resting bar 20 is tilted to the left in consequence of the roller of the rocker frame 6 engaging the non-eccentric surface of cam 9, the springs 21 are bent back (to the left) to move the sensing pins away from the surface of the tape record 5, and to open the engagement with their respective contact springs 22. It is during this time; that is, when the sensing pins AA—FE are furthest from the surface of the record 5 that the armature of magnet STP is in its extreme left position; that is, in the unoperated position, resting on the flattest portion of cam 10.

When the shaft 4 rotates to the point where the roller of the rocker frame 6 begins to ride the crest of cam 9, bar 20 will be rocked to the right, carrying with it the springs 21 and the severally affixed sensing pins AA—FE, the latter moving through their respective guide holes in the guide plate 7 to engage the surface of the record 5 when the roller of the rocker frame will have engaged the surface of highest eccentricity on cam 9. At this time the roller on the armature of magnet STP will be riding the crest of cam 10, thereby causing the pawl 15, as said before, to engage the succeeding notch in the ratchet wheel 3 in preparation to advance the feed-roll 1 (and the record 5) to the succeeding reading position; that is, to the next transverse line of perforations. The surfaces of the cams 9 and 10 are so proportioned that the armature of magnet STP will have completed its travel back to normal and thereby advanced the record 5 one reading position before the rocker frame 6 will have reached its extreme right position to cause the sensing pins AA—FE to engage the record 5. When the frame has reached this position, the sensing pins will be pressed against the record and those pins which stand opposite depressions will engage the same while the remainder will be stopped and held by the surface of the record. For those pins which engage depressions, spring carriers 21 will engage their associated contact springs 22 and ground the same for a purpose described hereinafter.

Thus as a result of the continuous rotation of the cam shaft 4, a reciprocal but synchronized action takes place between the rocker frame 6 and the armature of magnet STP, the sensing pins AA—FE being pressed against the record 5 at the time that the armature of the magnet STP is resting on the low point of cam 10, the pins being furthest from the surface of the record 5 at the time the armature is resting on the high point of cam 10. It is obvious that this interrelation between the rocker frame 6 and the armature of the magnet STP insures that the record 5 is advanced one position when the pins are away from the record and that sensing takes place when the record is stationary.

The reperforator selector RS is a typical code-bar selecting device which is used as part of the present invention to select one of a given number of given reperforator mechanisms RP0—RP9 in response to the sensing by some of the pins AA—FE of the code of the intelligence character designating the reperforator to be selected. This device comprises a number of pivoted U-bars U0—U9, in this instance equal to the ten available reperforators RP0—RP9, and a number of magnet-controlled code-bars CA—CE, in this instance equal to the five code-perforating positions in the record 5 which are reserved for each intelligence character except the first. Each of these bars rests slidably within two aligned grooves on two horizontal cross members 67 and 23 (as shown in detail in Fig. 1A for the code-bar CA and the groove therefor in bar 67), said bars 67 and 32 being rigidly secured to the frame of the apparatus. The forward end of each code-bar is a disc of magnetic material and adapted to be attracted to the core of its associated magnet C—, while the rear end of each code bar is provided with a resilient spring 68 hooked to the stationary cross member 24 secured to the frame of the device. The tension in each of the springs 68 is such that the associated code-bar is normally held away from the core of its associated magnet (as illustrated, for example, by code-bars CC, CD and CE), and when the magnet is energized, the code bar is pulled forward and held against the tension of the spring 68 so that when the magnet is released, the bar is drawn back to its normal position by the spring. Consequently the reperforator selector RS will contain ten U-type bars designated U0—U9 and five code-bars designated CA—CB. It is to be understood, however that the use of ten U-bars and five code-bars constitutes no limitation in the construction of the selector RS as it is obvious that the latter may be expanded, contracted or modified to suit the number of available reperforators and/or the number of code positions used for each of the intelligence characters.

Each of the code-bars CA—CE is notched along its upper edge to selectively produce in horizontal alignment with the other code-bars one of ten grooves into which one particular U-bar, and only one, may fit when any two of the code-bars are selectively drawn forward according to a certain code given below by the energization of their respective magnets CAM—CEM.

Each U-bar has a lever portion 26 which controls a pair of contact springs 27, and the downward tilting action of all of said bars (said bars being normally inclined rearwardly) is, in turn, effected by a release bar 28 controlled by the release magnet RM. To the release bar 28 is secured a protruding finger 29 for each U-bar, which is adapted to engage said lever portion 26. The release bar 28 is slidably supported at its ends by the tracked cross members 31 and 32 secured to the frame of the device. Normally, the release magnet RM is deenergized and the release bar 28 is drawn back along its supports by the retractile spring 30 attached to the rear end of the bar and secured to the frame of the device. In the normal position of this bar the fingers 29 push back the lever portions 26 of the U-bars, causing the latter to be tilted upward so that their respective cross-rods clear the upper surfaces of the code bars CA—CE. When, however, two of the code select magnets CAM—CEM have been selectively operated in the manner to be described hereinafter, and their associated code-bars CA—CE are drawn forward to produce a channel across all of the code-bars, and the magnet RM is operated in the manner to be described, the release bar 28 is drawn forward in consequence thereof and all the U-bars are tilted downward, their respective fingers 29 being drawn forward, and nine of said bars will rest upon the upper unnotched edges of the code-bars CA—CE while the tenth one having its cross-rod directly over the channel formed by the code bars will fit into said channel. This bar designates the reperforator to be selected, and this fact is given electrical significance by the closure of the contacts 27 individual to the "operated" U-bar.

It is obvious that when the magnet RM is released, the bar 28 is drawn back by the spring 30 and the fingers 29, bearing upon the lever portions 26, will cause all the U-bars to assume their unoperated position, including the bar which was resting in the channel formed by code-bars CA—CE, said U-bar, when fully out of the channel, opening its associated contacts 27. The selector RS is then ready for another selection.

It should be understood that the reperforator selector RS above described is given by way of illustration only, as there are many other forms of selecting devices, including relay networks, which could be used in place thereof without departing from the scope of the invention as defined by the appended claims.

Figure 2:
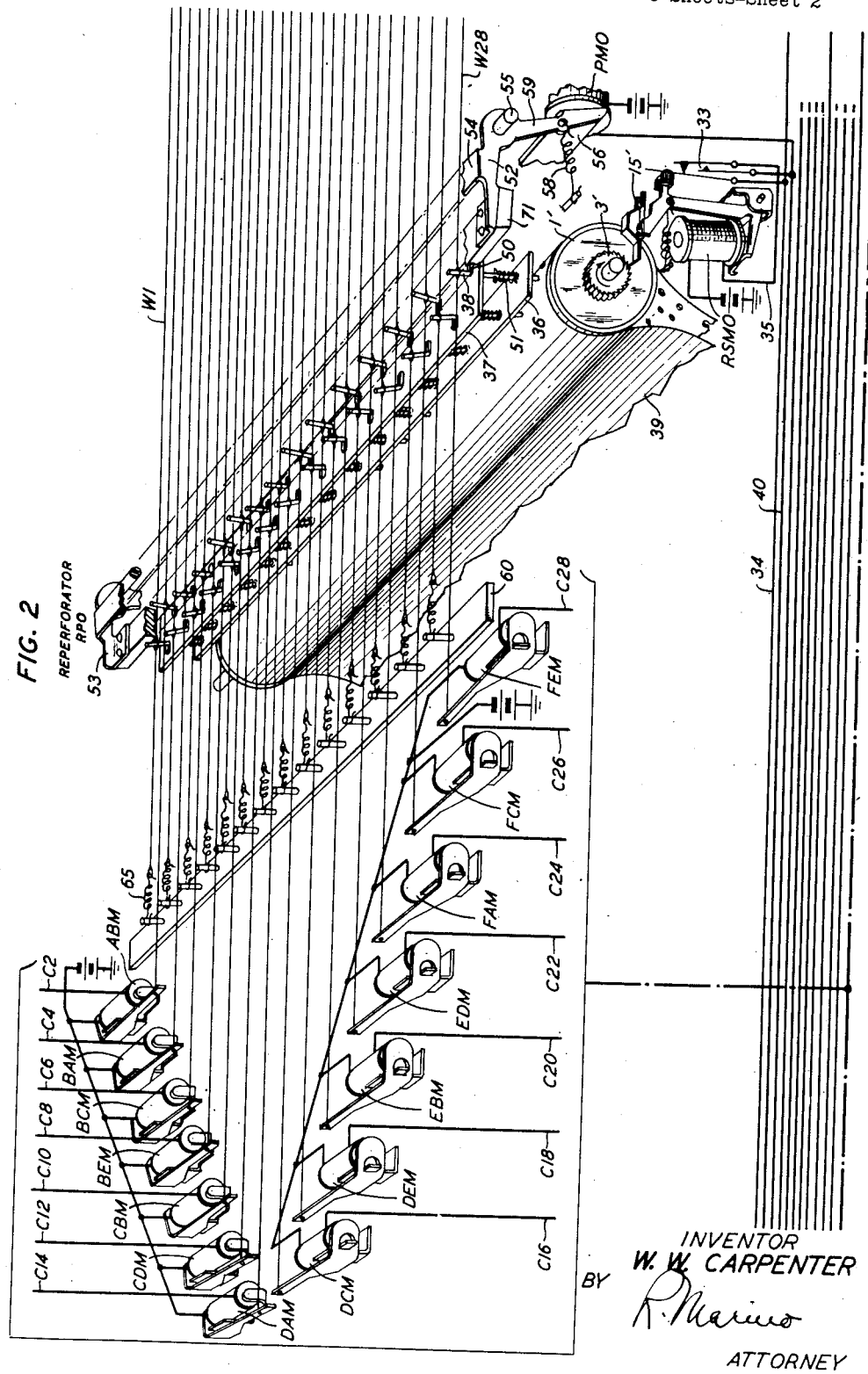
Fig. 2 is an isometric schematic showing of the first or "0" reperforator and a certain number of the pin-selecting magnets which are common to all reperforators.
Figure 3:
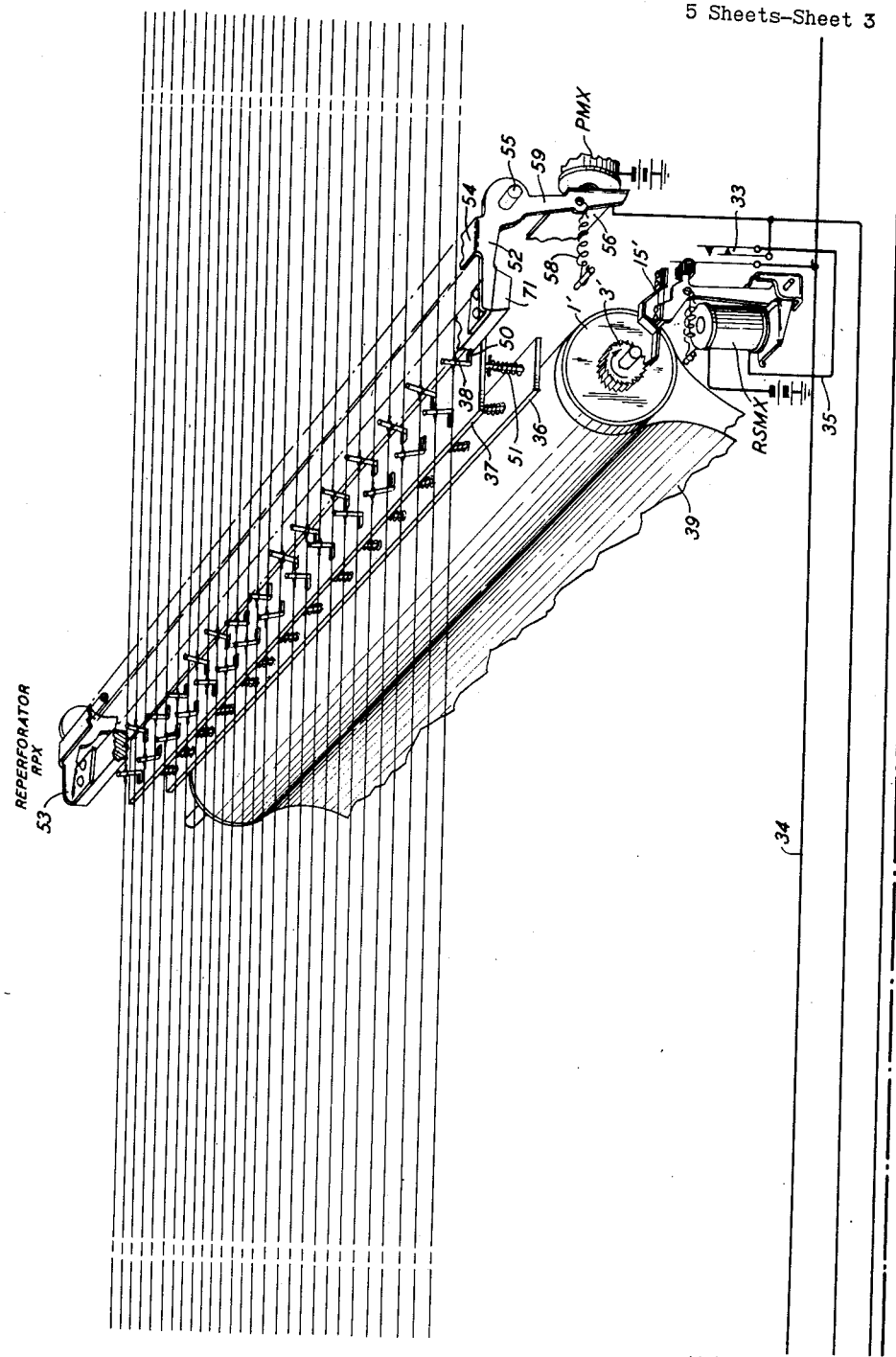
Fig. 3 is an isometric schematic showing of an intermediate reperforator.
Figure 4:
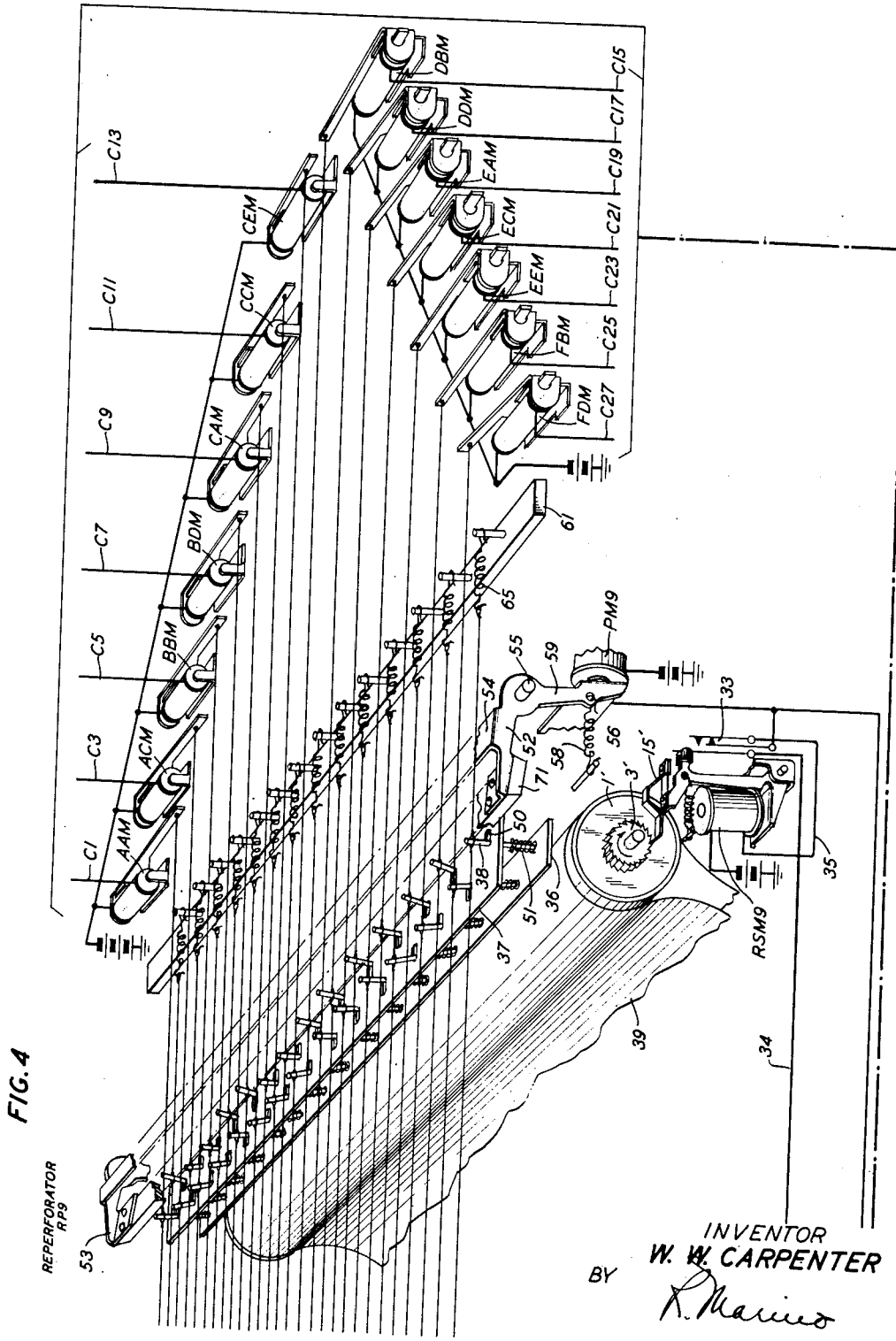
Fig. 4 is an isometric schematic showing of the last or "9" reperforator and the remainder of the pin-selecting magnets which are common to all reperforators.

The essential elements of the reperforator mechanism contemplated for use in this invention are illustrated in schematic form by the reperforators RP0, RPX and RP9 shown in Figs. 2, 3 and 4, respectively. Each of these reperforators (and all others available for selection by the reperforator selector RS) comprises a tape feed-roller 1' preferably of similar construction to the tape feed-roller 1 of the tape sensing device TS, rotatively controlled step-by-step by the magnet RSM— coacting through its armature pawl 15' with the ratchet wheel 3' rigidly secured to one end of the roller. The armature controls the continuity contacts 33 which, in the normal or unoperated position of the armature, connect the winding of magnet RSM— with the winding of the punch-hammer magnet PM— and which, in their operated position, connect conductor 34 to the winding of magnet RSM.

Fixedly disposed directly above the roller 1' are the two spaced rectangular guide plates, the lower plate 36 and the upper plate 37. These plates hold the punch pins 38 of which as many are furnished as there are punch positions provided across the width of the tape 39 to be punched, the latter being supported upon the surface of the roll 1' by the perforations (or depressions) thereon, said tape being "started" on the roll 1' by non-significant depressions produced on the tape in any suitable manner so as to provide the required traction for the tape upon the rotation of the feed-roll 1'. It is the purpose of the two plates 36 and 37 to furnish guiding support for the punch pins 38, and to this end the upper plate 37 is provided with a right conical slot 50 for each pin, said slot having a vertical and an oppositely inclined surface, while a similar but smaller slot for each pin is provided in the lower plate 36. The slots in each plate are provided in two parallel rows, but the slots in one row are staggered with respect to the slot in the other row, the slots all being parallel to each other and to the cross-axis of the plate in which they are located, the vertical surfaces of the slots in each row being towards the center of the plate. The pins 38 are disposed in the slots as shown in Figs. 2, 3, or 4, the slots in the lower plate 36 being so located with respect to the corresponding slots in the upper plate 37 that the pins, when inserted through the aligned slots in both plates, come to rest against the inclined surfaces of the two supporting slots as shown in Fig. 5A. By means described below the pins may be tilted to abut against the opposite vertical surfaces of the two supporting slots, at which time the pins will assume a vertical position with the points thereof directly over the uppermost two rows of tapered holes in the feed-roll 1'. When the pins or any of them are tilted to the vertical position as described and as shown in Fig. 5B, they are in the punching position, and it is obvious from said figure that if the pins in such punching positions are driven downward, they will pass through the tape 39 until the points of the pins will have registered with the associated tapered holes in the feed-roll 1'.

Each punch pin 38 is provided with a compression spring 51 disposed intermediate the two guide plates 36 and 37, said spring being hooked in two holes of the pin, one located at the lower extremity of the pin immediately above the upper surface of the plate 36 and the other located at a distance below the lower surface of the plate 37, said distance being equal to the distance the pin must travel to fully engage the tapered hole in the feed-roll 1'. As the pin is pressed downward, the spring is compressed to store energy therein which will restore the pin back to its normal position when the downward pressure is removed.

The reperforator is provided with an L-shaped punch-hammer pivoted on the fixed rod 55, said punch-hammer comprising a head 71 secured between the two end flanges 52 and 53, an armature member 56 and a magnet PM— for actuating said armature. A spring 58 secured to the member 59 and to the frame of the reperforator keeps the punch-hammer in the normal unoperated position; that is, with the armature away from the core of the magnet and the head 71 above the horizontal plane formed by the tops of the punch pins 38. When the magnet PM– is energized, the hammer is rotated counter-clockwise to bring the head 71 thereof directly over those punch pins which have been tilted to the vertical position (as will be described shortly) and to drive the latter through the tape 39. When the magnet PM– is released, spring 59 draws the armature 69 away from the magnet, thus causing the hammer to be swung clockwise until the bottom surface of the head 71 clears the tops of all the pins 38.

The head 71 is somewhat longer than the length of the roll 1' and, therefore, longer than the plates 36 and 37, while its width is, on the one hand, smaller than the distance between the tops of the opposite rows of punch pins 38 when normal (as shown in Fig. 5A) and, on the other hand, larger than the distance between such opposite pins when drawn into the vertical operating position (as shown in Fig. 5B). If the pins or any of them are drawn into a vertical position prior to the energization of the magnet PM–, it is clear that the pins so drawn will have their heads brought underneath the hammer head 71, and will be driven by the latter through the tape 39 when the hammer is brought into striking position by the energization of the magnet PM, as shown in Fig. 5B.

It has been stated that the pins 38 are moved into positions underneath the head 71 when said pins are tilted to a vertical position. This tilting is accomplished in part by means of the twenty-eight pin magnets AAM–FEM of which one is provided for all correspondingly located punch pins in each of the reperforators RP0–RP9. The coil windings of said pin magnets are severally connected by means of the wires C– to the pin-carrier springs 21 of the sensing device TC, the particular magnet wired to a specific spring being indicated by the correspondence between the designation of the sensing pin secured to the spring and the first two letters of the designation of the magnet. Thus one terminal of the winding of magnet AAM, for example, is connected by wire C1 to the spring secured to sensing pin AA. The other terminal of the winding of the magnet is connected to grounded battery as shown. The remaining pin magnets ABM–FEM are wired in a similar manner to the other sensing pins.

In the drawings these pin magnets are divided into two groups of fourteen each, one group being shown in Fig. 2 to the left of the first reperforator RP0 and the other group being shown in Fig. 4 to the right of the last reperforator RP9. To the armatures of these magnets are connected, respectively, the pull wires W1–W28 (the first and last only being designated) and the latter are further connected to each of the correspondingly located punch pins in each of the reperforators RP and supported through retractile springs 65 on the binding posts secured to the two oppositely located supporting bars 60 and 61, both of said bars being secured to the frame of the mechanism substantially in a plane that insures alignment of the pull wires W1–W28 with the punch pins to which they are connected. The pin magnets AAM–FEM are, of course, disposed on the mechanism in any suitable manner to insure that when the magnets operate and their armatures are attracted, the pull wires W– respectively secured to said armatures will be drawn towards the magnets substantially along a horizontal line.

In view of the above arrangement, the manner in which the punch pins 38 are drawn (or tilted) to the vertical position and the manner in which the pins so drawn are caused to be driven through the tape 39 by the punch-hammer 71 may easily be followed by reference to the figures of the drawings. Thus assume that pin magnet FEM is energized. The armature thereof is drawn towards the core of the magnet and the tip (to which is connected the pull wire W28) is drawn to the left, pulling the wire W28 likewise to the left. Since this pull wire is connected to the foremost punch pin of the right row in each of the reperforators, it follows that when magnet FEM is energized, all of said pins will be drawn to the left until each of them abuts against the vertical surface of the slot 50 within the plates 36 and 37 in which each pin is supported in the reperforator of which it is a part. Since these slots are so formed as to have aligned vertical left surfaces, it further follows that when the pins are pulled against these surfaces, they assume an upstanding or vertical position. The first pin in the right row of each reperforator (that is, the pin connected to the pull wire W28 and, therefore, controlled by the pin magnet FEM) is thus moved into a position to be struck by the punch-hammer 71 of each associated reperforator.

In the same manner the remaining punch pins in each of the reperforators may be tilted to the vertical position selectively or as a whole by the operation of the appropriate ones of the pin magnets. If the punch-hammer magnet PM– of a selected one of said reperforators is operated, then those pins of the selected reperforator which have been shifted to the vertical position by the selective operation of the pin magnets AAM–FEM will be driven through the tape of said selected reperforator, to cause holes to be punched in the corresponding positions of the tape 39. Since the punch-hammers 71 of the unselected reperforators will not be actuated, the corresponding pins in these reperforators will, of course, remain unactivated notwithstanding the fact that they have been tilted to the punch position by the operation of the common group of pin magnets. On the other hand, if the punch-hammer magnet PM– of each reperforator is energized, then the punch-hammer 71 of each reperforator will be operated and the positioned pins in each of said reperforators will be driven through their respective tapes 39 to punch holes therein, thus causing the apparatus to act simply as a reproducing device.

Thus after the punch pins 38 in each of the reperforators RP0–RP9 are moved to the punch position by the selective operation of the common pin magnets AAM–FEM, it is a matter of choice whether the pins of one reperforator are driven through the tape 39 controlled by said reperforator or the pins of all reperforators are driven through the respective tapes 39 of all of said reperforators. It all depends upon which and how many of the punch-hammers 71 of the available reperforators it is desired to operate.

Having thus described in detail the mechanical structure of the different components of one embodiment of my invention, I will now describe how the contents of a prepared record such as record 5, can be selectively reproduced on a tape of one of the reperforators, having due regard for the fact that the selection of a reperforator will be made in accordance with the value of an intelligence character in one group of intelligence characters to be reproduced.

Referring to Fig. 5C which shows one row of perforations of the record tape 5, the twenty-eight punch positions on the tape (reading from left to right) are indicated by circles, each with a notation thereabove to indicate the number of the punch position and an arrow underneath to indicate the sensing finger that senses the position. Only the first (AA) and last (FE) of the designations of said sensing fingers are indicated in Fig. 5C, the designation of the other sensing fingers being the same as the designations of the various punch positions except that they are capitalized for distinction.

The twenty-eight punch positions on the record 5 are allocated for purposes of illustration to six digits A to F, inclusive, with the A digit having but three positions for recording the digital values 1, 2 or 3 in the positions $aa$, $ab$ and $ac$, respectively, while the remaining five digits B to F, inclusive, each have five positions for recording one of the ten digital values 0–9 by means of the following 2 out of 5 code in which two perforations out of five indicate a given digital value.

| Digital Value | Positions Punched (in any digit position except the A digit) |
|---|---|
| 0 | $-a, -b$ |
| 1 | $-a, -d$ |
| 2 | $-b, -d$ |
| 3 | $-d, -e$ |
| 4 | $-b, -e$ |
| 5 | $-c, -d$ |
| 6 | $-a, -c$ |
| 7 | $-b, -c$ |
| 8 | $-c, -e$ |
| 9 | $-a, -e$ |

It will thus be seen that according to the above code each digital value of the five digits B to F, inclusive, will always be represented by two perforations. When the record 5 is placed over the feed-roll 1 of the tape sensing device TS and power is applied to the cam shaft 4, the sensing pins AA–FE are rocked back and forth by the action of cam 9 to cause said sensing pins to impinge upon the surface of the record 5, said record being advanced forwardly step-by-step by the action of the magnet STP, as previously explained. It will be assumed that the record is thus advanced until the perforations of the number 174330 become aligned opposite the sensing pins. In Fig. 5C the perforations designating this number are shown by the filled-in punch positions in the various digital positions.

When the pins engage the record, the pins AA, BB, BC, CB, CE, DD, DE, ED, EE, FA and FB opposite, respectively, the perforations in positions 1, 5, 6, 10, 13, 17, 18, 22, 23, 24 and 25 (as noted in the tape shown in Fig. 5C) will engage said perforations and contacts 21 and 22 individual to each of said pins will be closed.

It will be noted that a key KY is provided having five transfer springs 1–5. Each of these transfer springs is connected by a wire to the winding of a select magnet C– in the reperforator selector RS, the right stationary springs being connected to the mates 22 of springs 21 secured to the sensing pins FA–FE sensing the F or sixth digit, the left stationary springs being connected to the mates 22 of the springs 21 secured to the sensing pins EA–EE sensing the E or fifth digit.

It is intended in the present embodiment of the invention that for the purpose of illustration the succession of numbers punched in code on the record tape 5 shall be transferred to the tape 39 of a reperforator RP– which is selected according to the value of the F or sixth digit, or the value of the E or fifth digit depending, respectively, upon whether key KY is operated to the right (as shown) or to the left. Obviously if it is desired to select a reperforator according to the value of any other digit, it is only necessary to provide the required number of keys and wire said keys to the appropriate springs 22 in the same manner as key KY is wired to the springs 22 engaging the springs 21 connected to the sensing pins of the E and F digit. In this manner and by the operation of the appropriate numerical key, a reperforator may be selected according to the value of any digit recorded on the tape 5.

Now let it be assumed that selection of a reperforator is to be made according to the value of the F or sixth digit; key KY is therefore operated to the right, as shown. And let it further be supposed that the number 174330 is the first number recorded on the tape 5. Since the value of the F or sixth digit is "0" the selection of reperforator RP0 is thereby indicated.

Since at the time when the indicated sensing pins are engaging the depressions, the armature of magnet STP is held against the core thereof by the action of cam 10, springs 16 will be closed, whereupon ground will be applied to conductor 34 for a purpose described hereinafter; and since, at this time, the springs 21 individual to each of the sensing pins that have engaged the depressions are also closed as above described, ground common to the springs 21 will be applied through the mates 22 thereof to conductors C1, C5, C6, C10, C13, C17, C18, C22, C23, C24 and C25. Furthermore, since key KY is operated to the right, ground on conductor C24 is extended through the No. 1 contacts of said key to the winding of select magnet CAM. Also, ground on conductor C25 is extended through the No. 2 contacts of said key to the winding of select magnet CBM. Since battery is permanently connected to the other terminal of all of the select magnets CAM–CEM, the circuits of magnets CAM and CBM are thereby completed. The latter magnets operate and draw forward the select bars CA and CB to form, with the unoperated bars CC–CE, a continuous transverse groove to accommodate the bar U0 when the latter is drawn downward in consequence of the operation of the magnet RM, which occurs at the same time as the select magnets CA and CB are operated, by virtue of the fact that the grounded springs 13, controlled by cam 11 which has its surface of highest eccentricity in alignment with that of cam 9, are closed at this time to complete an obvious circuit for the magnet RM. When the bar U0 is in the channel, springs 27 individual to said bar are closed, and since the grounded springs 14, controlled by cam 12, are also closed at this time, a circuit is thereby completed from ground on said contacts 14, contacts 27, conductor 40, normally made contacts 33 of magnet RSM0 (said contacts being shown open however due to the fact that said magnet is shown operated), winding of said magnet to battery. The same ground is applied to complete an obvious circuit for the punch-hammer magnet PM0. Magnet RSM0 operates to advance its pawl 15' to the next notch in the ratchet wheel 3', the magnet locking through the front contacts 33, conductor 34, contacts 16, to ground. Magnet PM0 operates to drive the hammer head 71 down upon those pins 38 of reperforator RP0 which, in the meanwhile, have been tilted to the vertical position. This tilting of the pins has taken place as follows:

The ground applied to conductors C1, C5, C6, C10, C13, C17, C18, C22, C23, C24 and C25 close obvious circuits to the pin select magnets AAM, BBM, BCM, CBM, CEM, DDM, DEM, EDM, EEM, FAM AND FBM, causing said magnets to operate and attract their respective armatures. Since the armatures of these magnets are connected to the pull wires W−, said wires are pulled by the armatures to cause the corresponding punch pins 38 connected to said wires in each of the reperforators RP0-RP9 to be tilted to their respective vertical positions.

At the same time that the circuits of the indicated pin select magnets are closed, the ground on the wire 40 completes the circuit of magnet PM0 of reperforator RP0 as above indicated. This magnet (as well as all other magnets PM−) is slow in operating relative to the operation of the pin select magnets. Consequently by the time magnet PM0 is ready to operate its associated punch-hammer and bring the head 71 thereof in striking position, the punch pins moved by the operated pin select magnets will have been tilted into position directly underneath said head, whereupon, as the armature 56 is drawn completely to the core of the magnet PM0, said pins are driven through the tape 39 of the reperforator RP0 to punch holes (or depressions) therein across the tape in absolute correspondence to the holes (or depressions) on the record 5 in response to the sensing of which the punch pins of all reperforators RP0-RP9 were set. The number 174330 on the record 5 is thus reproduced on the tape 39 of reperforator RP0, the latter having been selected in accordance with the digital value "0" of the F or sixth digit.

The operation of magnet RSM0 closes the continuity contacts 33 as described, whereupon the magnet locks to ground on conductor 34 under the control of springs 16, the pawl 15′ having been latched in the next tooth of the ratchet wheel 3′. When the cam shaft 4 rotates to the point where springs 13 and 14 are opened, cam 9 will have been rotated to present its non-eccentric surface to the roller of the rocker frame 6, in consequence of which the rocker bar 20 is drawn outward to pull the sensing pins AA-FE away from the record 5, and the springs 21 secured to those pins which had engaged the perforations in the record will disengage their respective mate springs 22, thereby removing ground from the involved conductors C− and opening the circuits of the operated pin select magnets including, for the ground removed from conductors C24 and C25, the opening of the circuit of the selector magnets CAM and CBM of the reperforator selector RS. Since by this time ground will have been disconnected from conductor 40, releasing thereby the punch magnet PM0 and restoring the punch-hammer 71 to its normal position, the release of the pin select magnets will cause the involved pull wires W− to be drawn back by their restoring springs 65, thus returning the connected punch pins in all reperforators back to their normally inclined position.

Further, when the flat surface of cam 9 is presented to the roller of the rocker frame 6, the flat surface of cam 10 is presented to the roller of the armature of the stepping magnet STP. The armature, therefore is tilted to the left under the power of restoring springs 17, the pawl 15 is released to advance the feed-roller 1 one notch or punch position in the clockwise direction and the contacts 16 are opened, thereby releasing the punch magnet PM0. All the apparatus is now normal and ready to sense the next row of intelligence characters on the record 5 and reproduce the same on a tape 39 of a reperforator R− selected in response to the sensing of the F or sixth digit in said row of intelligence characters.

It is obvious from the foregoing that with key KY thrown to the right, the selection of a reperforator will be always in accordance with the value of the F or sixth digit and that, accordingly, all numbers having the same digital value for this digit will be reproduced in the same reperforator. Thus all numbers having "0" for the value of the F or sixth digit will be reproduced on tape 39 of reperforator RP0, all numbers having "1" as the value of this digit will be reproduced on tape 39 of reperforator RP1, and so on up to and including the value "9" of this digit, which will cause all numbers having this value for the sixth digit to be reproduced on reperforator RP9.

If key KY is thrown to the left, then the selection of the reperforator will be in accordance with the value of the E or fifth digit, since the left stationary contacts of this key are connected to the sensing pins EA−EE to cause the selective completion thereby of circuits to the select magnets CAM−CEM of the reperforator selector RS in accordance with the 2-out-of-5 code given above.

It is further obvious, as previously stated, that by providing a suitable number of keys by means of each of which the sensing pins AA−FE associated with other digits can be caused to be connected to the magnets CAM−CEM, the selection of the reperforator may be controlled by the value of any one of said other digits.

Thus according to this invention, not only is it possible to segregate and reproduce numbers on separate records according to the value of a particular digit in each of the group of digits to be reproduced, but the apparatus may be used repetitively with each of the reproduced records to assemble miscellaneously assorted multidigit numbers into a numerical sequence. Thus the record produced by the reperforator RP0, in which the value of sixth digit in each number therein is 0, may itself be passed through the sensing device TS, and the selection of a reperforator may be made accordingly to the value of the E or fifth digit (by operating key KY to the left), whereupon all numbers having "00" for the value of the last two digits will be reproduced on tape 39 of reperforator RP0, while all numbers having "01" for the value of these two digits will be reproduced on tape 39 of reperforator RP1, and so on up to and including the values "09" of the last two digits which will be reproduced on tape 39 of reperforator RP9. The record thus produced by reperforator RP0 may then be passed again through the tape sensing device TS and selection made according to the fourth digit, whereupon the numbers on this record will then be distributed amongst the tapes 39 of the ten reperforators in the numerical sequence indicated by the value of the last three digits, the operation being repeated for each record until, ultimately, ten records are produced each having their respective numbers arranged in the proper numerical sequence beginning with the sixth digit the value of which will correspond to the number of the reperforator last used in making its own last record.

While I have described my invention in connection with a specific application thereof, it is to be understood that other applications and embodiments thereof may be made by those skilled in the art without departing from the spirit of the invention as defined by the scope of the appended claims.

What is claimed is:

1. The method of classifying record intelligence comprising groups of intelligence characters, which consists in simultaneously transmitting a group of intelligence characters to each one of a plurality of reproducing instruments, and selecting according to a character in said group one of said instruments for reproducing all the characters in the group.

2. The method of arranging miscellaneously assorted multidigit numbers in numerical sequence by means of record media, a record medium sensing device, and record media producing devices, which comprises causing the sensing device to sense all the numbers and control the recording devices to record all of said numbers on media digitally sorted according to the values of all the first order digits of the number system in which the numbers exist, causing the same or another sensing device to resense all the numbers of all the digitally sorted media in an order beginning with the lowest digit and proceeding to the highest digit of the previous sorting and to control the recording device to rerecord the numbers on record media selectively according to the values of the second order digits, and so on for all the digital orders until all the numbers in their entirety are recorded on a number of media which, placed end to end in the order of their lowest to their highest digits of highest order, contain all the numbers in numerical sequence.

3. A record-controlled reproducing system comprising in combination a record having thereon groups of intelligence characters, a plurality of reproducing devices, means responsive to the sensing of one of said groups of intelligence characters for simultaneously setting each one of said plurality of reproducing devices into correspondence with said sensed group of intelligence characters, and means responsive to a character in said group for selecting one of said devices to reproduce said group of intelligence characters.

4. A record-controlled reperforating system comprising in combination a plurality of reperforators, each of said reperforators having a tape-advancing roll, a plurality of punch pins, means for supporting said punch pins over said tape-advancing roll, a punch-hammer disposed over said punch pins and normally out of engagement therewith, a magnet common to correspondingly located pins in each of said reperforators, and means for connecting all of said corresponding punch pins with the armature of the corresponding magnet, whereby the energization of the magnet operates said means to shift the pin in each reperforator underneath the punch-hammer thereof.

5. In a record-controlled reperforating system the combination of a device for sensing a perforated record containing a plurality of intelligence characters in code, a plurality of reperforators each provided with a punch-hammer and a plurality of perforating elements settable to operating positions, means responsive to the sensing of said plurality of intelligence characters for setting to the operating position selected and corresponding perforating elements in each of said plurality of reperforators, and means responsive to a selectable one of said intelligence characters for operating the punch-hammer of one of said plurality of reperforators, whereby the operated perforating elements in said perforator are driven through a perforating medium to perforate in code the plurality of intelligence characters sensed by said sensing device.

6. A device for transferring data represented by perforations in a sheet to one of a plurality of receiving devices, comprising in combination with said plurality of receiving devices a sensing mechanism for simultaneously sensing positions in one or more rows on the sheet for perforations, means responsive to said sensing mechanism sensing one or more rows of perforations for simultaneously setting each of said receiving devices in accordance with said sensed perforations, and control means for selecting one of said receiving devices in accordance with perforations in one or more sensing positions in the rows of positions simultaneously sensed by said sensing mechanism.

7. A device for transferring data represented by perforations in a sheet to one of a plurality of receiving devices comprising in combination with said plurality of receiving devices a sensing mechanism for simultaneously sensing positions in one or more rows on said sheet for perforations, common means for simultaneously setting all of said receiving devices in accordance with perforations in the rows of positions simultaneously sensed by said sensing mechanism, and means responsive in accordance with some of the perforations sensed for selectively operating one of said receiving devices, thereby to record all of the sensed perforations on a medium individual to said selected receiving device.

8. A device for transferring data represented by perforations comprising a sensing mechanism for simultaneously sensing a plurality of rows of perforations on a record sheet, a plurality of reperforators each having a punch-hammer and punch pins, means common to all of said reperforators controlled by the sensing mechanism to effect a selective simultaneous setting of the punch pins in each reperforator in accordance with the simultaneous sensing of a plurality of rows of perforations by the sensing mechanism, and means responsive to one or more of the perforations sensed for operating the punch-hammer of a selected one of the reperforators, whereby all of the perforations sensed by said sensing mechanism are reproduced by said last-mentioned reperforator.

9. In a combined code sorting and reproducing mechanism for multidigit entries, the different digits of which are each symbolized by a different pattern of perforations on a recording medium, a reading device comprising means adapted to cooperate with said perforations for sensing said entries, a plurality of reperforators each having perforating elements and normally inoperative means for controlling the movement of said elements to and from perforating position, electrical means for rendering operative the controlling means of one of said reperforators in response to a digital pattern in one of the digital orders of an entry sensed by said sensing means, and electrical means controlled by said sensing means for preparing the perforating elements in said reperforator for reproducing the digital patterns of said entry.

10. In a combined code sorting and reproducing mechanism for multidigit entries, the different digits of which are each symbolized by a different pattern of perforations on a recording medium, a reading device comprising means adapted to cooperate with said perforations for sensing said entries, a plurality of reperforators each having perforating elements and normally inoperative means for controlling movement of said elements to and from perforating position, electrical means controlled by said sensing means for enabling the perforating elements of all of said reperforators for operation to reproduce the digital patterns of an entry sensed by said sensing means, and electrical means for rendering operative the controlling means of a particular one of said reperforators in response to a digital pattern in one of digital orders of said entry.

11. In a combined code sorting and reproducing mechanism for multidigit entries, the different digits of which are each symbolized by a different pattern of perforations on a recording medium, a reading device comprising means adapted to cooperate with said perforations for sensing said entries, electrical means controlled by said sensing means for selecting one of a plurality of reperforators for each entry in response to a digital pattern in one of the digital orders of said entry, means for varying the digital order determinative of reperforator selection, and electrical means controlled by said sensing means for preparing the perforating elements for operation in the selected reperforator to reproduce the digital patterns of the entry sensed in said reading device.

WARREN W. CARPENTER.

References Cited in the file of this patent

UNITED STATES PATENTS

| Number | Name | Date |
|---|---|---|
| 983,254 | Swing | Jan. 31, 1911 |
| 985,258 | Grimsdale | Feb. 28, 1911 |
| 2,031,686 | Borel | Feb. 25, 1936 |
| 2,087,674 | Nelson | July 20, 1937 |
| 2,093,529 | Tauschek | Sept. 21, 1937 |
| 2,204,957 | Carpenter et al. | June 18, 1940 |